June 10, 1969     G. R. PIPES ET AL     3,448,534
SNOWPLOW FOR VEHICLE

Filed Aug. 20, 1965     Sheet 1 of 3

INVENTORS
GEORGE R. PIPES
ALBERT HOLLINSHEAD
BY
Teagno, Sadler & Toddy
ATTORNEYS

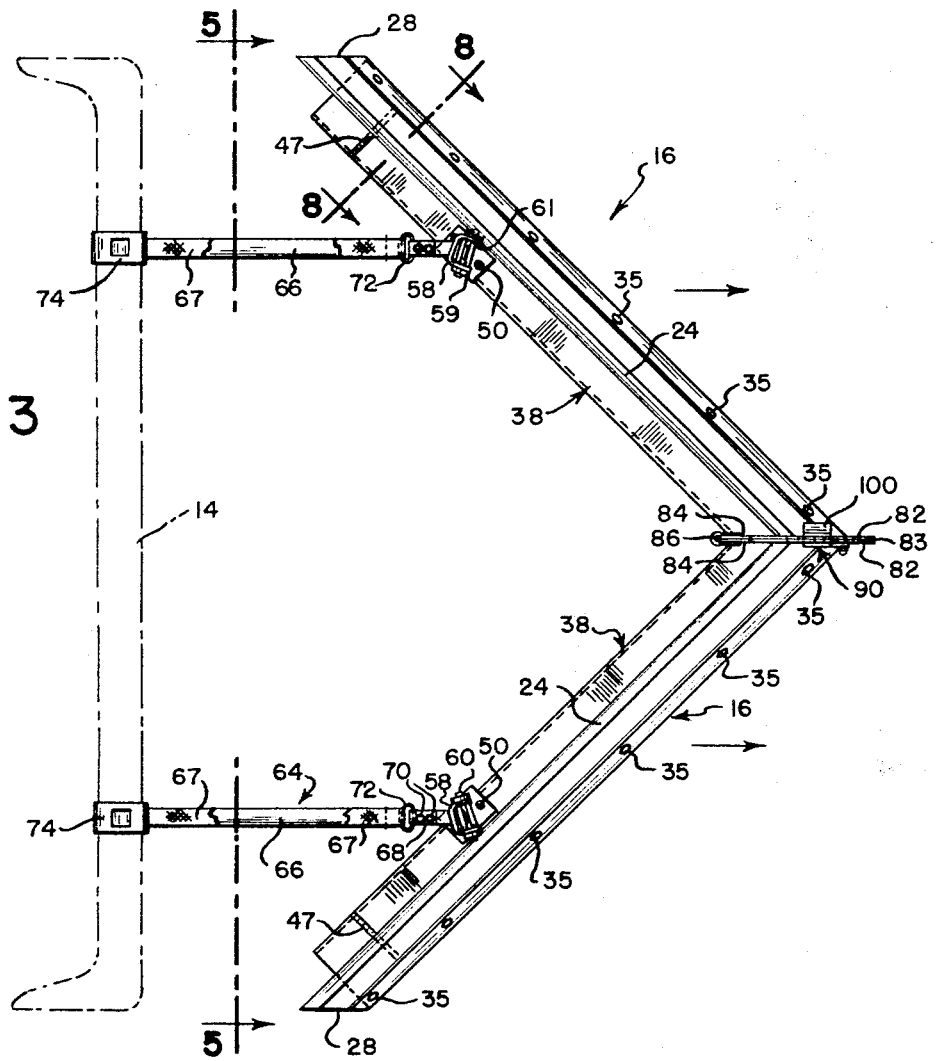
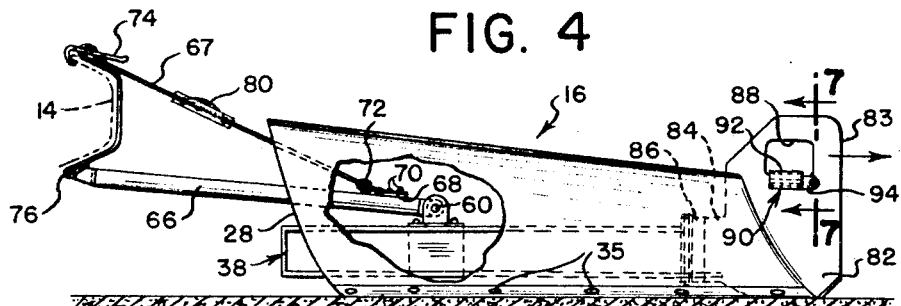

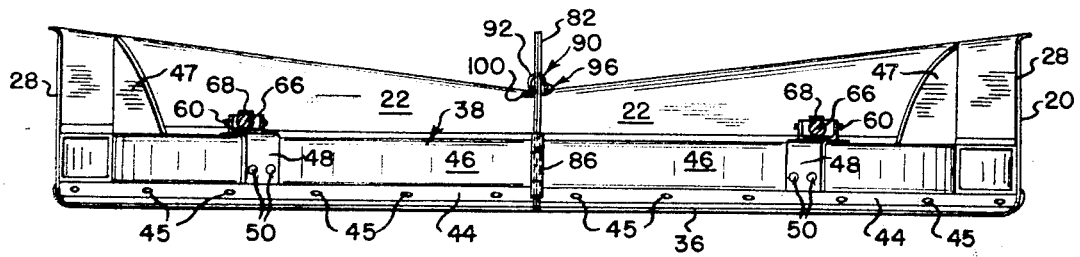
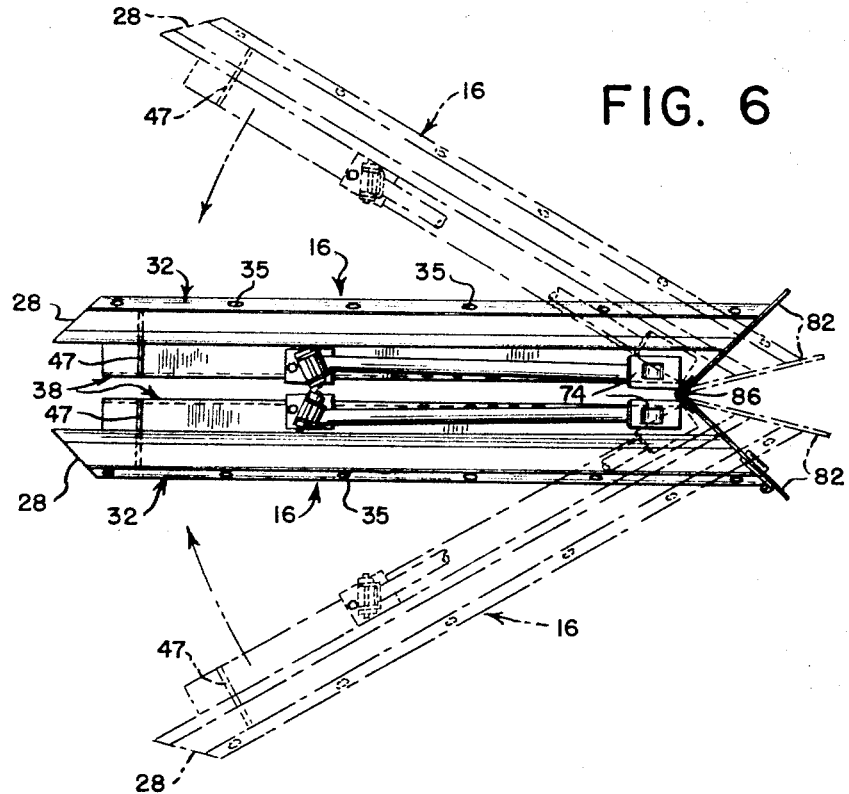
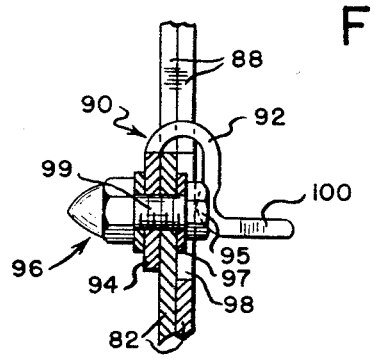

United States Patent Office 3,448,534
Patented June 10, 1969

3,448,534
SNOWPLOW FOR VEHICLE
George R. Pipes, South Euclid, and Albert Hollinshead, Novelty, Ohio, assignors to Eaton Manufacturing Company, Cleveland, Ohio, a corporation of Ohio
Filed Aug. 20, 1965, Ser. No. 481,227
Int. Cl. E01h 5/06
U.S. Cl. 37—44                    10 Claims

ABSTRACT OF THE DISCLOSURE

A snowplow for a vehicle including a pair of moldboards with a pivot at one end of said moldboards and a nose plate secured to each of said moldboards and extending therefrom on the opposite side from said pivot such that when the moldboards are angularly disposed to one another the nose plates are in substantially parallel relationship to one another and further wherein the moldboards are substantially parallel to one another the nose plates are disposed angularly to one another so as to provide a supporting stand for the snowplow.

---

The present invention pertains, generally, to a snowplow for a vehicle and, more particularly, to detachable snowplowing apparatus that can be readily removably connected to either the front or rear bumper of a vehicle, such as an automobile, and the like.

It is not infrequent to encounter a snow-bound automobile during the winter months when it is parked on local streets, or in the owner's garage. Of necessity, then, a great deal of time and effort is involved in extricating the snow before the auto can be used. These problems are not limited to parked vehicles. Thus, snow storms have been encountered while travelling that cover the roadway to such an extent as to present hazardous driving conditions, as well as to cause considerable delay and annoyance.

The recognition of these problems has resulted in the development of snowplows for clearing a roadway in advance of a moving vehicle. Such devices or apparatus of this type as have heretofore been suggested, however, have not been of such compact construction that they could be readily carried as an accessory in the automobile, or stored in an owner's garage in a minimal space. In addition, such prior snowplowing devices or apparatus are not constructed and arranged to facilitate ready and quick attachment to and disassembly from a vehicle, with the result that users of such apparatus are dissatisfied.

Having in mind each and everyone of the foregoing disadvantages, and others that will be readily apparent to those skilled in the art, it is a primary object of the present invention to provide detachable snow plowing apparatus that can be readily removably connected to either the front or rear bumper of a vehicle, such as an automobile, and the like, said apparatus being of simple construction, light weight, durable, efficient in operation, and capable of fabrication at a relatively minimal capital expenditure.

Another primary object of this invention, in addition to each and everyone of the foregoing objects, is to provide detachable snowplowing apparatus that can be readily removably connected to either the front or rear bumper of a vehicle, such as an automobile, and the like, said apparatus being constructed and arranged to enable the ready and quick attachment to and disassembly from the vehicle within a short period of time, and preferably without requiring the use of tools.

Yet another primary object of the present invention, in addition to each and everyone of the foregoing objects, is to provide detachable snowplowing apparatus that can be readily removably connected to either the front or rear bumper of a vehicle, such as an automobile, and the like, said apparatus being constructed and arranged as to be collapsible with facility, and capable of being stowed in small spaces, such as are available in private garages, and with its parts or elements still connected, to prevent the loss or misplacement thereof.

A further primary object of this invention, in addition to each and everyone of the foregoing objects, is to provide detachable snowplowing apparatus that can readily be removably connected to either the front or rear bumper of a vehicle, such as an automobile, and the like, said apparatus being constructed and arranged as to preclude the likelihood of injury or damage to the vehicle when in use, or injury or damage to driveways, and the like, as a result of any tendency of the plow to dig into the ground, or the failure thereof to pass over minor obstructions.

Still further, it is a primary object of the present invention, in addition to each and everyone of the foregoing objects, to provide detachable snowplowing apparatus that can readily be removably connected to either the front or rear bumper of a vehicle, such as an automobile, and the like, such apparatus being collapsible for transportation as an accessory in the vehicle.

Other objects and important features of the present invention will be apparent from a study of the specifications following taken with the drawing, which together show, illustrate, describe and disclose a preferred embodiment or modification of the invention, and what is now considered to be the best mode of practicing the principles thereof. Other embodiments or modifications may be suggested to those having the benefit of the teachings herein, and such other embodiments or modifications are intended to be reserved especially as they fall within the scope and spirit of the sub-joined claims.

In the drawings:

FIGURE 3 is a planned view of the snow plowing apparatus illustrated in FIGURES 1 and 2, shown as being deatchably connected to the front bumper of a vehicle;

FIGURE 4 is a projected side elevational view of the snow plowing apparatus of the present invention, and its arrangement with the front bumper of a vehicle, shown in FIGURE 3;

FIGURE 5 is a front elevational view of the snow plowing apparatus of the present invention, looking in a direction towards the interior thereof, and taken along the line 5—5 of FIGURE 3;

FIGURE 6 is a plan view of the snow plowing apparatus of the present invention, illustrating the path of travel along which certain elements travel to collapse the apparatus for storage purposes;

FIGURE 7 is a cross-sectional view of another element of the snow plowing apparatus of this invention, taken along the line 7—7 of FIGURE 4.

Figure 1:
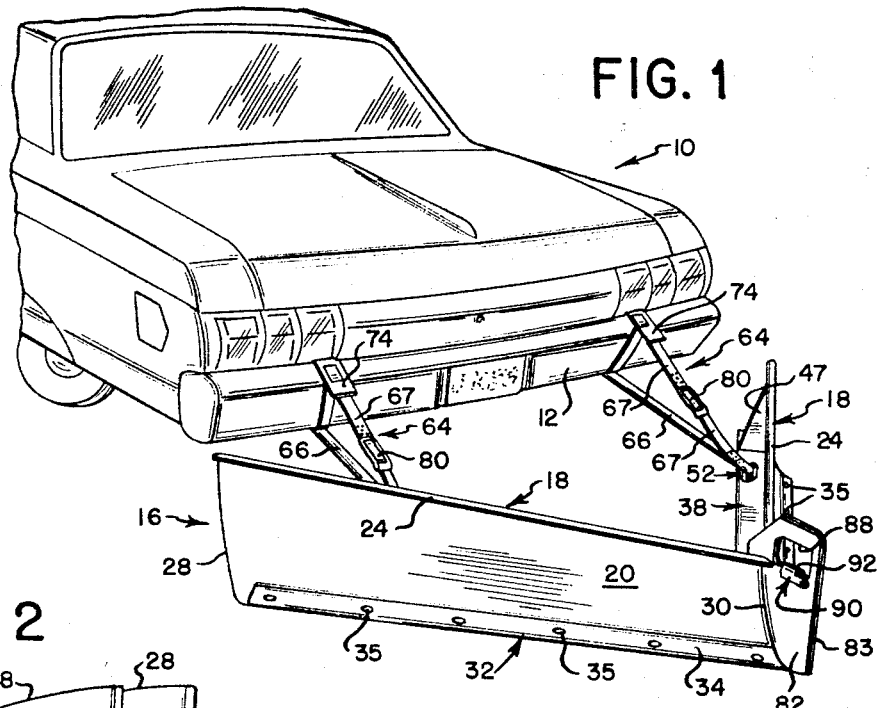
FIGURE 1 is an isometric view of a detachable snow plowing apparatus constructed in accordance with the principles of the present invention, illustrated as having been detachably connected to the rear bumper of an automobile.

With particular reference now to the drawings, and especially FIGURE 1 thereof, there is illustrated therein a vehicle 10, such as an automobile, comprising a rear bumper 12 and a front bumper 14 (see FIGURE 3) with which a vehicle accessory or snow plowing apparatus 16, constructed in accordance with the principles of the present invention, is particularly adapted to be utilized.

As will hereinafter be pointed out in greater detail, the snow plowing apparatus is particularly adapted to readily be removably connected to either one of the bumpers.

The vehicle accessory or snow plowing apparatus comprises a plurality of moldboards 18 having a body portion 20 of generally outwardly directed concave configuration to define interior surfaces 22 that face one another and are of generally convex configuration.

Each of the moldboards 16 comprise a top ledge 24 that extends substantially completely of the length of the body portion 20 thereof, and extends laterally outwardly therefrom. A bottom ledge 26 also runs substantially completely of the length of the body portion of each moldboard, and extends laterally outwardly therefrom at an obtuse angle with respect thereto.

The moldboards 16 each of them further comprise a trailing edge 28 and a leading edge 30. The trailing and leading edges 28 and 30, respectively, are tapered from the top ledge 24 to the bottom ledge 26 in a direction, that, in effect, extends toward the leading edge.

A shoe 32 is particularly adapted to be fixedly connected to the bottom ledge 26. To this end, the shoe comprises one leg 34 that is fixedly secured to the ledge 26 in any suitable manner, as through the medium of suitable fasteners 35, such as rivets, and the like. The shoe 32 comprises another or second leg 36 that is disposed at an acute angle with respect to the leg 34, enabling the moldboards 18 to rest upon the ground cap G when the apparatus 16 is disposed in a position of use.

A unitary shelf 38 of channel-shaped configuration is particularly adapted to be fixedly connected to each of the moldboards 18 on the convex surface 22 thereof. The shelves 38 extend substantially completely the length of the body portion 20 of each of the moldboards, and comprise an upper generally horizontally disposed leg 40 that is secured to the body portion 20 in any suitable manner, as though the medium of welds 41. The shelves further comprise a lower generally horizontally extending leg 42 having an extension or extending portion 44 disposed in obtuse angular relationship with respect thereto. The extension 44 is fixedly connected to the bottom ledge 26 of the moldboard 18 in any suitable manner, as through the medium of rivets 45, or the like. A generally vertically extending leg 46 extends between the legs 40 and 42.

As hereinbefore pointed out, the shelves 38 extend substantially completely of the length of the body portions 20 of each of the moldboards 18. To provide strength, rigidity and durability to the structure thus far described, a brace 47 of generally triangular configuration is fixedly secured to the body portion 20 of each of the moldboards adjacent the trailing edge 28 thereof, and extends from the upper ledge 24 to the upper horizontal ledge 40 of each shelf 38.

A base or mounting bracket 48 of generally L-shaped configuration is fixedly mounted on each of the shelves 38 in any suitable manner, as through the medium of suitable fasteners 50, such as bolts, or the like.

A bracket 52 of generally U-shaped configuration is fixedly and non-movably mounted upon the base 48 through the medium of a suitable fastener 54, such as a bolt, or the like. The fastener 54 extends through the brackets 52 substantially at the center thereof. A pivot pin assembly 56 is pivotally movably connected to the bracket 52, and comprises a bracket 59 of generally U-shaped configuration mounted between the ears 59 thereof. The bracket 58 of the assembly 56 is non-rotatably mounted upon a pivot pin 60 which extends between and through the ears 61 thereof. The pin 60 then extends through the ears 50 of the bracket 52 in rotatable relationship with respect thereto.

The axis of the pivot pin 60 is disposed at a pre-determined angle with respect to a longitudinal axis of the shelf 38 passing through the fastener 54. This angle is approximately 67½ degrees, for purposes that will hereinafter be described in greater detail.

The pivotally movable bracket 56 comprises, a bite or bite portion 62 to which there is fixedly connected, a universal bumper hitch assembly 64. The universal bumper hitch assemblies 64 each of them comprise a rod that is fixedly connected to the bight 62 in any suitable manner, but in such a manner as to define an acute angle with respect to the axis of the pivot pin 60, with which the bite 62 is substantially parallel. This acute angle between the longitudinal axis of the rod 66 and the axis of the pivot pin 60 is approximately 67½ degrees. It will now be seen that the acute angle defined between the longitudinal axis of the rod 66 and a similar axis of the pivoot pin 60 is substantially equal to the acute angle defined between the axis of the pivot pin and the longitudinal axis of the shelf 38. Accordingly, when in a position of use, the rod 66 of each of the hitch assemblies 64 will be disposed in the position shown, for example, in FIGURE 3, and when in a position of non-use, will be disposed in a position in which the longitudinal axis thereof corresponds with or lies along the axis of the shelf. In this manner, when the hitch assemblies 64 have been translated to a position of non-use, as particularly illustrated in FIGURE 6, the snowplow apparatus 16 will be most compact, and will occupy the least amount of storage space.

The hitch assemblies 64 each of them further comprise a strap 67, one end of which is particularly adapted to be fixedly connected to the rod 66. To this end, a fastener 68 is fixedly connected to the rod in any suitable manner, as through the medium of rivets 70, and comprises a ring 72 that passes through a loop in the strap 67, as illustrated, for example, in FIGURE 3.

The strap 67 extends along the rod 66 of each of the hitch assemblies 64 and passes through a hitchplate 74. The construction of the hitchplate 74 is such as to define a tortuous path at the location where the strap 67 passes through, to preclude relative movement therebetween when the apparatus 16 is in a position of use. Additionally, the hitch configuration of the hitchplates 74 is chosen to enable each plate to securely engage the bumpers of a vehicle in the absence of accidental dislodgement therefrom, as clearly illustrated, for example, in FIGURE 4. The strap 67 of each of the hitch assemblies 64, at the other end thereof, is connected to the rod 66 through the medium of a pin 76 that enables the strap to at least move pivotally with respect thereto.

It will now be understood that the universal bumper hitch assemblies 64 are particularly adapted to removably and yet securely position or connect the snowplowing apparatus 16 upon and with respect to either the front or rear bumpers 14 and 12, respectively, of a vehicle 10, such as an automobile. This can be accomplished with extreme facility by simply placing the hitchplate 74 of each of the assemblies 64 in the position illustrated in FIGURE 4, in which it engages the intended bumper. In FIGURES 3 and 4, the apparatus is illustrated as having been removably positioned upon the front bumper 14 of the vehicle 10. The rod 66 of each of the assemblies 64, which is of rigid construction, will inherently be positioned below the bumper as also illustrated in those figures, and the strap 67 inherently disposed in a position in which it conforms to the configuration of the bumper. It is, of course, desirable that provision be made to insure a secure connection with the bumper, and, to that end, each of the universal bumper hitch assemblies 64 further comprises a buckle assembly 80 which may be of any suitable and conventional construction.

The moldboards 18 each of them further comprise a noseplate 82 fixedly connected thereto, in any suitable manner, at the leading edge 30 thereof. The noseplates 82 are each of them of generally rectangular but irregular configuration that defines a supporting edge 83. The noseplates 82 each of them comprise a projection 84 that extends therefrom in a direction towards the trailing edge 28 of the moldboards. At the location of the projections 84, the noseplates 82 are particularly adapted to be pivotally connected to one another, and, to that end, there is provided a hinge assembly 86, which may be of the piano-type. Since the noseplates 82 are fixedly connected to the moldboards 18, and since they are pivotally connected to one another, the moldboards themselves are pivotally movable between a position in which they are disposed for use, as illustrated in FIGURE 3, and a position in which they are disposed for storage, as clearly illustrated in FIGURE 6.

The noseplates 82 each further comprise an aperture 88. It will now be understood that, when the moldboards are disposed in a position of use, as shown in FIGURE 3, it is desirable that they be retained in that position during the performance of their intended functions. To that end, a clamping assembly 90 is pivotally mounted upon one of the noseplates, and is particularly adapted to fixedly but removably connect the plates and, thus, the moldboards in an operative position or a position of use with respect to one another. The clamping assembly 90 comprises a C-shaped clamping member 92 having an integral leg 94 that is pivotally connected to one of the noseplates in any suitable manner, as through the medium of a fastener 96 comprising a conventional nut 95, washer 97 and bolt 99. The other noseplate is provided with a recess 98 adjacent the aperture 88, within which the nut 95 and washer 97 may be disposed. This insures a substantially flush relationship with the outer surface of the noseplate 82. The C-shaped clamping member 92 comprises a finger 100 to facilitate movement of the clamping member between its operative and inoperative positions. It will now be understood that, in the operative position of the clamping member 92, illustrated in FIGURES 1, 3, 4 and 7, the clamping assembly 90 has been rotated in a substantially counter-clockwise direction, disposing the clamping member 92 so that it abuts against the outer surface of the noseplate 82 adjacent thereto. When it is desired to move the moldingboards 18 to an inoperative position, or a position of non-use, the clamping assembly 90 is simply rotatably moved or pivoted in a generally clockwise direction. Accordingly the clamping member 92 will simply pass through the aperture 88 of the free noseplate.

The use and operation of the vehicle accessory or snow plowing apparatus 16, constructed in accordance with the principles of the present invention, is considered readily apparent. A snow plow is thus provided which can be fixedly and yet removably connected to either the front or rear bumper of a vehicle, such as an automobile, quickly, easily, with facility, and without the necessity of using tools. The snowplow 16 is free of cross braces, bracing stress, and the like, to provide the simplest conceivable construction, one but yet is capable of unusually efficiently performing its intended functions. The moldboards 18 are pivotally movable or translatable between a position of non-use, or an inoperative position, and a position of use through the medium of noseplates 82 which are pivotally connected to one another by the hinge assembly 86. The noseplates 82 are connected to each of the moldboards 18, at the leading edge 30 thereof, to define an angle between each noseplate and its corresponding moldboard that is approximately one-half of the angle defined by and between the moldboards when disposed in a position of use. In the latter position, the clamping assembly retains the noseplates 82, and therefore, the moldboards 18 therein, by engaging both of the noseplates.

Figure 2:
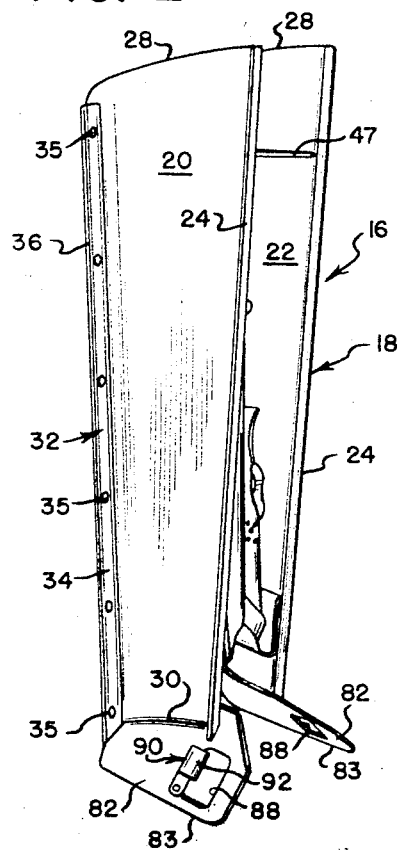
FIGURE 2 is an isometric view of the snow plowing apparatus shown in FIGURE 1, illustrated as having been collapsed and capable of being stored in a minimal space, such as in a garage, or as being carried in the trunk of a vehicle, as an accessory thereof.
Figure 8:
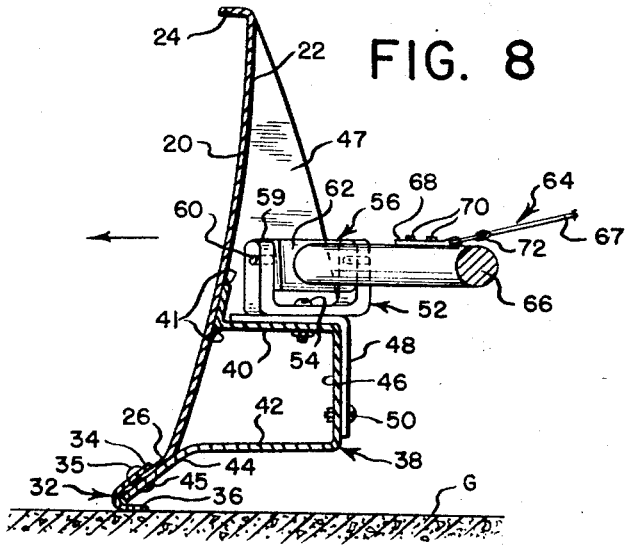
FIGURE 8 is a cross-sectional view taken along the line 8—8 of FIGURE 3.

As hereinbefore pointed out, the configuration of the noseplates 82 in such as to define a supporting edge 83 to facilitate storage of the snowplow apparatus. Accordingly, when it is desired to so dispose of the snowplow, or to carry it in the trunk of a vehicle as an accessory thereof, it is simply necessary to pivot the clamping assembly 92, through the medium of the finger 100, in a clockwise direction to release the noseplates. As clearly shown in FIGURE 6, it is then necessary only to pivotally move or translate the moldboards 18 towards one another. When the moldboards are disposed in the position illustrated in that figure in solid lines, the bumper hitch assemblies 64 may then, themselves, be pivotally moved to an inoperative position, or a position of non-use. In such a position, the hitch assemblies, and the rod 66 and the strap 67 thereof will be disposed along the longitudinal axis of the shelves 38, as clearly illustrated in FIGURE 6. This is true because of the angular relationship between the longitudinal axis of the shelves and the same axis of the pivot pin 60, and the angular relationship between the pin and the rod 66. The snowplow apparatus may then be stored in a garage, for example, in an up-standing position, in which position for supporting edges 83 of the noseplate 82 will be disposed upon the floor, ground, or the like. Because of the hereinbefore defined angle between each of the noseplates and moldboards, an acute angle will be defined therebetween which is approximately the same as the angle included by the moldboards in a position of use. The nose-plates will therefore provide more than sufficient stability to enable the snowplow apparatus 16 to be disposed in an up-standing storage position, as particularly illustrated in FIGURE 2. As will now be considered readily apparent, the snowplow will occupy a minimal amount of space.

The hitch assemblies 64 are universal, as hereinbefore pointed out. That is, they are adapated to be secured to any configuration of vehicle bumper. The straps 67, which may be fabricated of a flexible material, extend through the hitchplates 74 and between the ends of the rod. Each of the straps comprise a buckle assembly 80, which may be of any suitable and conventional and construction, enabling the straps to be tightened, further enabling the end of the rod inherently disposable between the bumper to be fixedly retained in that position by that portion of the straps extending from the hitchplates thereto.

While the invention has been shown, illustrated, described and disclosed in terms of an embodiment or modification which it has assumed in practice, the scope of the invention should not be deemed to be limited by the precise embodiment or modification herein shown, illustrated, described or disclosed.

We claim:
1. Snowplowing apparatus particularly adapted to be fixedly and yet removably connected with either the front or rear bumper of a vehicle, such as an automobile, or the like, and comprising, in combination:
    a plurality of moldboards each comprising:
      a shelf fixedly connected thereto and extending along the length thereof, and wherein there is provided:
      a pivot pin assembly pivotally mounted upon each of said shelves;
    the longitudinal axis of said pivot pin assembly defining a predetermined angle other than a right angle with respect to a longitudinal axis of said shelves;
    a nose plate fixedly connected to each of said moldboards;
    said nose plates being pivotally connected to one another to enable said moldboards to be pivotally moved between an operative position and a storage position;
    said nose plates, when abutted, being effective to maintain said moldboards in the operable position;
    said nose plates being configured to define a supporting edge, enabling said moldboards to be disposed in an upstanding position when they are moved to said storage position, further enabling said apparatus to present a compact appearance and to be stored in a minimal amount of space; and
    a hitch assembly pivotally connected to each of said moldboards, and being pivotally movable between an operative position and a storage position;

said hitch assemblies each being securable to and removable from a bumper of a vehicle and comprising:
a rod fixedly connected to said pivot pin assemblies at other than a right angle with respect to the longitudinal axis thereof;
said last mentioned angle being substantially the same as the angle defined between the longitudinal axis of the pivot pin assemblies and said shelves, enabling said hitch assemblies to be pivoted to said storage position in which the assemblies are disposed along along said shelves.

2. Snowplowing apparatus as defined in claim 1, wherein:
a U-shaped bracket having upstanding ears is fixedly positioned upon each of said shelves; and wherein said pivot pin assemblies comprise:
a U-shaped bracket having ears positioned between and adjacent a corresponding one of the ears of the bracket positioned on said shelves, and a bight extending therebetween; and
a pivot pin extending between and through the ears of each said U-shaped brackets to enable said pivot pin assemblies to pivot with respect to the brackets positioned on said shelves; and wherein:
the rod of said hitch assemblies are fixedly connected to the bight of the U-shaped bracket of each pivot pin assembly.

3. Snowplowing apparatus as defined in claim 1, wherein said hitch assemblies each further comprise:
a strap connected at one end thereof to the rod adjacent to the corresponding pivot pin assembly;
a hitch plate configured to be secured to and removable from the bumper of a vehicle;
said strap passing through said hitch plate and, at another end thereof, being pivotally connected to said rod; and
a buckle assembly for tightening the strap.

4. Snowplowing apparatus particularly adapted to be fixedly and yet removably connected with either the front or rear bumper of a vehicle, such as an automobile, or the like, and comprising, in combination:
a plurality of moldboards each comprising:
a body portion;
a shelf fixedly connected to the body portion of each moldboard, and extending along the length thereof;
a bracket fixedly positioned upon each of said shelves;
a pivot pin assembly pivotally connected to each of said brackets;
the brackets positioned on said shelves being disposed to enable the longitudinal axis of said pivot pin assemblies to define a predetermined angle other than a right angle with respect to a longitudinal axis of said shelves;
a hitch assembly connected to each of said pivot pin assemblies and being pivotally movable between an operative position and a position of storage with respect to said shelves;
said hitch assemblies being securable with and removable from the bumper of a vehicle; and
a nose plate fixedly connected to each of said moldboards and extending away from the moldboards on the opposite side of the pivot pin;
said nose plates pivotally movable with said moldboards and each being configured to define a supporting edge, enabling the moldboards to be disposed in an upstanding position when they are moved to said storage position, further enabling said apparatus to present a compact appearance and to occupy a minimal amount of storage space.

5. Snowplowing apparatus as defined in claim 4, wherein said hitch assemblies each comprise a rod fixedly connected to said pivot pin assemblies at a predetermined angle other than a right angle with respect to the longitudinal axis thereof, said last mentioned angle being substantially the same as the angle defined between the longitudinal axis of said pivot pin assemblies and said shelves, enabling said rod and thus the hitch assemblies to be pivoted to said storage position in which the assemblies are disposed along said shelves.

6. Snowplowing apparatus as defined in claim 5, wherein:
said nose plates are fixedly connected to each of said moldboards at a predetermined angle other than a right angle with respect thereto;
the angle between said nose plates and said moldboards being approximately one-half of the angle defined between said moldboards when disposed in an operative position;
said nose plates abutting one another when the moldboards are disposed in said operative position; and
said hitch assemblies, when disposed in an operative position, defining a predetermined angle other than a right angle with the longitudinal axis of said shelves that is approximately the same as the angle defined between said nose plates and said moldboards;
said hitch assemblies further comprise:
a strap connected at one end thereof to the rod adjacent the pivot pin assemblies;
a hitch plate configured to be secured to and removable from the bumper of a vehicle;
said strap passing through said hitch plate, and at another end thereof, being pivotally connected to said rod; and
a buckle assembly for tightening said strap.

7. Snowplowing apparatus as defined in claim 6, wherein said nose plates each comprise:
a projection, each projection having an aperture, and said apertures being in alignment when the nose plates are disposed in abutment with ane another; and
a hinge assembly operable in said apertures for pivotally connecting the nose plates together, enabling said moldboards to be pivotally moved between said operative position, in which the nose plates abut one one another, and said storage position.

8. Snowplowing apparatus as defined in claim 7, wherein there is further provided:
a pivotable clamping assembly for maintaining the nose plates in abutment with one another, and for maintaining the moldboards in said operative position, and comprising:
a leg pivotally connected to one of said nose plates; and
an integral C-shaped clamping member adapted to extend through the aligned apertures when the nose plates abut one another, said clamping member having a finger to facilitate pivotal movement.

9. A snowplow apparatus particularly adapted to be fixedly and yet removably connected with either the front or rear bumper of a vehicle, such as an automobile or the like, and comprising, in combination:
a pair of moldboards connected at their forward end in angular relationship;
a rod connected to each of said moldboards and extending rearwardly of the moldboards;
hitch assemblies for each of said rods including:
a strap connected at one end thereof to the rod adjacent the point of connection of the rod to the moldboard;
a hitch plate adapted to be secured to and removable from the bumper of a vehicle;
said strap passing through said hitch plate, and at the other end thereof, being connected to said rod; and
strap tightening means between the hitch plate and the moldboard.

10. Snowplowing apparatus particularly adapted to be fixedly and yet removably connected with either the front or rear bumper of a vehicle, such as an automobile, or the like, and comprising, in combination:
- a plurality of moldboards;
- a nose plate fixedly connected to each of said moldboards;
- said nose plates being pivotally connected to one another to enable said moldboards to pivotally be moved between an operative position and a storage position;
- said nose plates each being configured to define a supporting edge, enabling the moldboards to be disposed in an upstanding position when they are moved to said storage position, further enabling said apparatus to present a compact appearance and to be stored in a minimal amount of space;
- said nose plates each further comprise:
  - a projection having an aperture, said apertures being in alignment when said moldboards are disposed in the operable position;
  - a pivotable clamping assembly for maintaining said nose plates in alignment, and comprising a leg pivotally connected to one of said nose plates; and
  - an integral C-shaped clamping member adapted to extend through the aligned apertures when the nost plates abut one another, said clamping member having a finger to facilitate pivotal movement;
- a hitch assembly pivotally connected to each of said moldboards, and being pivotally movable between an operative position and a position of storage with respect thereto;
- said hitch assemblies each being securable to and removable from the bumper of a vehicle.

References Cited
UNITED STATES PATENTS

| | | | |
|---|---|---|---|
| 1,661,158 | 3/1928 | Ball | 37—44 |
| 2,188,805 | 1/1940 | Borgeson | 37—44 |
| 2,299,451 | 10/1942 | Austin | 37—44 |
| 2,337,434 | 12/1943 | Washbond | 37—44 |
| 2,468,950 | 5/1949 | Wiedman | 37—42 |
| 3,349,507 | 10/1967 | Payne | 37—44 |

ABRAHAM G. STONE, *Primary Examiner.*

ALAN E. KOPECKI, *Assistant Examiner.*